US012153381B2

(12) United States Patent
Schlichtig et al.

(10) Patent No.: US 12,153,381 B2
(45) Date of Patent: Nov. 26, 2024

(54) CASE MIDDLE/HORN CONNECTION DEVICE FOR A WATCH

(71) Applicant: ETA SA Manufacture Horlogère Suisse, Grenchen (CH)

(72) Inventors: Dohan Schlichtig, Olten (CH); Jérôme Grosjean, Orvin (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 408 days.

(21) Appl. No.: 17/636,207

(22) PCT Filed: Aug. 21, 2020

(86) PCT No.: PCT/EP2020/073474
§ 371 (c)(1),
(2) Date: Feb. 17, 2022

(87) PCT Pub. No.: WO2021/058213
PCT Pub. Date: Apr. 1, 2021

(65) Prior Publication Data
US 2022/0276611 A1 Sep. 1, 2022

(30) Foreign Application Priority Data
Sep. 24, 2019 (EP) .................................... 19199357

(51) Int. Cl.
*G04B 37/14* (2006.01)
*G04B 37/22* (2006.01)

(52) U.S. Cl.
CPC ......... *G04B 37/1486* (2013.01); *G04B 37/22* (2013.01)

(58) Field of Classification Search
CPC ...................................................... B29C 65/08
See application file for complete search history.

(56) References Cited

U.S. PATENT DOCUMENTS 4,708,492 A 11/1987 Mock et al.
2002/0044501 A1 4/2002 Sato
(Continued)

FOREIGN PATENT DOCUMENTS

CH 668 159 G A3 12/1988
CH 708 815 A2 5/2015
(Continued)

OTHER PUBLICATIONS

Translation of FR 3021128, Espacenet (Year: 2015).*
(Continued)

*Primary Examiner* — Renee S Luebke
*Assistant Examiner* — Matthew Hwang
(74) *Attorney, Agent, or Firm* — Sughrue Mion, PLLC

(57) ABSTRACT

A method for attaching a horn to a watch case middle, a case middle/horn connection device and a case middle/horn assembly, the horn comprising a first connector and the case middle comprising a second connector having an undercut groove, the first connector cooperating with the second connector in order to attach the horn to the case middle. The method includes:

a placing the first connector of the horn in contact with the second connector of the case middle such that one or more intermediate cavities are formed between the undercut groove and the first connector;

a melting one portion of the horn so as to create a molten material;

a filling, at least partially, the one or more intermediate cavities by displacement of the molten material; and solidifying the molten material in order to make the horn integral with the case middle.

13 Claims, 4 Drawing Sheets

(56) References Cited

U.S. PATENT DOCUMENTS

| | | | |
|---|---|---|---|
| 2010/0238770 A1 | 9/2010 | Speichinger | |
| 2015/0124574 A1 | 5/2015 | Gracia et al. | |
| 2015/0300389 A1* | 10/2015 | Mayer | B29C 65/08 156/293 |
| 2017/0205770 A1 | 7/2017 | Leoni et al. | |
| 2017/0265607 A1 | 9/2017 | Hatanaka et al. | |
| 2018/0299832 A1 | 10/2018 | Dubois et al. | |

FOREIGN PATENT DOCUMENTS

| | | | | |
|---|---|---|---|---|
| EP | 0 197 416 A1 | 10/1986 | | |
| EP | 0 351 706 A1 | 1/1990 | | |
| EP | 0 466 655 A1 | 1/1992 | | |
| FR | 3021128 A1 * | 11/2015 | | A44C 5/147 |
| JP | 2017-517738 A | 6/2017 | | |
| JP | 2018-529970 A | 10/2018 | | |
| KR | 10-2002-0024792 A | 4/2002 | | |

OTHER PUBLICATIONS

International Search Report for PCT/EP2020/073474 dated, Dec. 4, 2020 (PCT/ISA/210).

Korean Office Action dated Feb. 27, 2024 in Application No. 10-2022-7009783.

* cited by examiner

CASE MIDDLE/HORN CONNECTION DEVICE FOR A WATCH

CROSS REFERENCE TO RELATED APPLICATIONS

This application is a National Stage of International Application No. PCT/EP2020/073474 filed Aug. 21, 2020, claiming priority based on European Patent Application No. 19199357.5 filed Sep. 24, 2019.

FIELD OF THE INVENTION

Generally, the invention concerns a method for attaching a horn to a watch case middle, a case middle/horn connection device and a case middle/horn assembly.

BACKGROUND OF THE INVENTION

Swiss Patent No. CH 708815 concerns an exterior element for a wristwatch case middle. The exterior element for a wristwatch case middle takes the form of a separate cover plate which is attached to the wristwatch case middle and at least partially covers an area of connection between a bracelet strand and the watch case middle.

European Patent No. EP 0466655 concerns a watch case and a device for attaching a bracelet to the watch case. The watch case middle comprises one or two recesses arranged to receive the end of each bracelet strand. The ends of the bracelet are retained by attachment means consisting of claws or hollows, corresponding to notches or protuberances provided in proximity to the ends of the bracelet strands, and which are arranged on extensions of the watch case back or on intermediate pieces secured to the back cover or middle part of the case.

European Patent No. EP 0197416 concerns an assembly consisting of a watch case element and a bracelet having at least one strand. The bracelet strand is made of a first thermoplastic plastic material. The watch case element is made of a second thermoplastic plastic material having a higher melting temperature than the melting temperature of the first plastic material. The watch case element comprises a portion surrounding at least one end of the strand and integral with this end.

GENERAL DESCRIPTION OF THE INVENTION

A first aspect of the invention concerns a method for attaching an attachment piece with at least one horn to a watch case middle, the attachment piece comprising a first connector and the case middle comprising a second connector having an undercut groove, the first connector cooperating with the second connector to attach the attachment piece to the case middle, and the method comprising:

- placing the first connector of the attachment piece in contact with the second connector of the case middle such that one or more intermediate cavities are formed between the undercut groove and the first connector;
- melting one portion of the attachment piece so as to create a molten material;
- filling, at least partially, the one or more intermediate cavities by displacement of the molten material; and
- solidifying the molten material in order to make the attachment piece integral with the case middle.

An 'undercut groove' means a groove whose shape prevents the direct release of solid material which, even partially, fills the latter.

"Integral" means that one element (for example the attachment piece with at least one horn) is irreversibly joined by contact to another element (for example the case middle).

Preferably, the first connector portion is melted by ultrasound. "Ultrasound" means a longitudinal sound wave whose frequency is comprised in a range of 16 to 10,000 kHz, preferably in a range of 16 to 5,000 kHz, more preferably in a range of 16 to 10,000 kHz, and most preferably in a range of 16 to 70 kHz.

According to one embodiment, the method includes applying a compression force between the attachment piece and the case middle which are placed in contact in order to fill, at least partially, the one or more intermediate cavities by displacement of the molten material.

According to one embodiment, the first connector comprises a tenon and the second connector comprises a mortise. The contact of the first connector of the attachment piece with the second connector of the case middle can be guided by the tenon and mortise.

According to a preferred embodiment, the first connector comprises two or more tenons and the second connector comprises two or more mortises. The contact of the first connector of the attachment piece with the second connector of the case middle can be guided by the tenons and mortises.

Preferably, the method includes the at least partial filling with molten material of one or more buffer cavities present between the first connector and the second connector when the latter are in contact.

A second aspect of the invention concerns a case middle/horn connection device for a watch case comprising an attachment piece with at least one horn comprising a first connector and a case middle comprising a second connector having an undercut groove. The first connector is configured to cooperate with the second connector in order to attach the attachment piece to the case middle. The first connector and the second connector are configured to be placed in contact such that one or more intermediate cavities are formed between the undercut groove and the first connector. Further, the one or more intermediate cavities are configured to allow at least partial filling of said cavities by displacement of the molten material from one portion of the first connector. The attachment piece and the case middle are configured to be made integral by solidification of the molten material.

According to one embodiment, the first connector portion is configured to be melted by ultrasound.

Preferably, the first connector, in particular the portion of the first connector, is (substantially) made of plastic. Optionally, the attachment piece is made of plastic.

According to one embodiment, the first connector comprises a tenon and the second connector comprises a mortise, the mortise being configured to guide the tenon when the first connector of the attachment piece is placed in contact with the second connector of the case middle.

Preferably, the first connector comprises two or more tenons and the second connector comprises two or more mortises, the mortises being configured to guide the tenons when the first connector of the attachment piece is placed in contact with the second connector of the case middle.

The device preferably comprises one or more buffer cavities between the first connector and the second connector when said connectors are in contact.

According to one embodiment, the first connector comprises one or more protruding deflectors so that the displacement of molten material occurs substantially only towards the one or more intermediate cavities.

According to one embodiment, the attachment piece has four horns.

A third aspect of the invention concerns a case middle/horn assembly obtained by the method for attaching an attachment piece with at least one horn to a watch case middle according to the first aspect of the invention.

BRIEF DESCRIPTION OF THE DRAWINGS

Other peculiarities and features of the invention will appear from the detailed description of certain advantageous embodiments presented below, by way of illustration, with reference to the annexed drawings which show.

The reader's attention is drawn to the fact that the drawings are not to scale. Further, for reasons of clarity, the proportions of height, length and/or width may not be correctly represented. Finally, and in particular, the spaces or recesses between the connectors when placed in contact may be greater or smaller than in an actual implementation of the invention.

DETAILED DESCRIPTION OF SEVERAL EMBODIMENTS OF THE INVENTION

Figure 1:
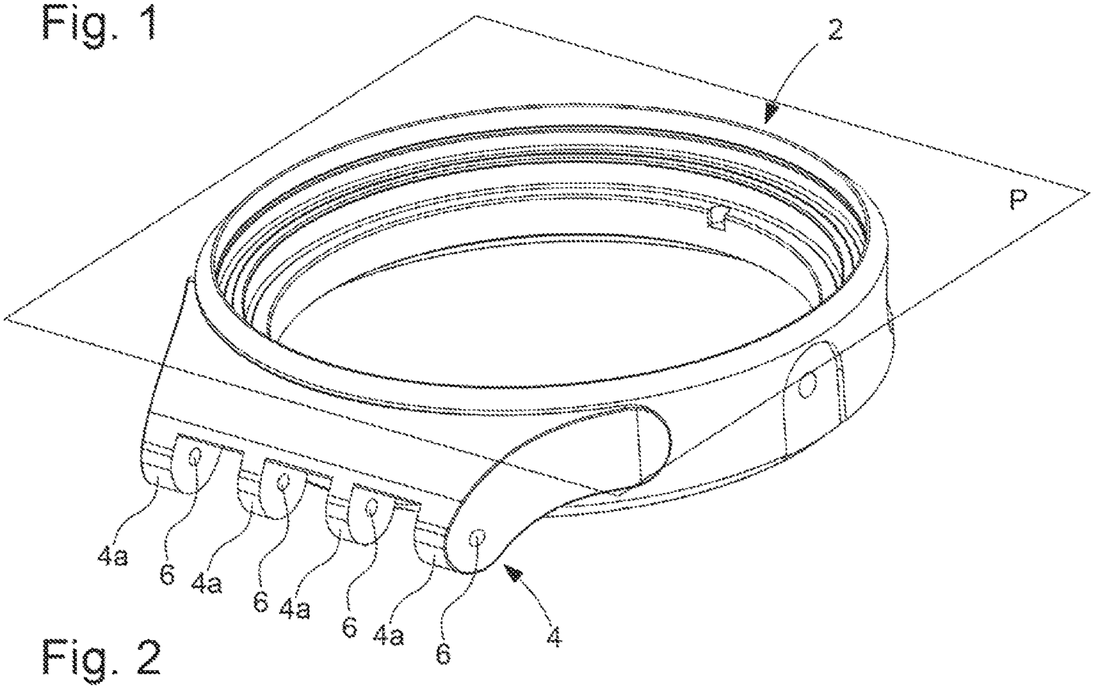
FIG. 1: a perspective view of a case middle/horn assembly according to one embodiment of the invention.

With reference to FIG. 1, an assembly of a case middle 2/attachment piece with at least one horn 4 (hereinafter the 'case middle/horn assembly') is described according to one embodiment of the invention. Case middle 2 is an element of a watch case (partially represented) used to protect the watch movement, e.g. from dust, moisture, shocks, etc. . . . It is the median portion of the watch case which accommodates the watch movement. According to the embodiment described, case middle 2 is circular. However, other shapes are suitable, such as, e.g. a square shape, a rectangular shape, an ellipsoidal shape, etc. . . . Case middle 2 defines a main plane P located at its mid-height.

The attachment piece with at least one horn 4 allows a bracelet to be attached to case middle 2. In the embodiment illustrated in FIG. 1, attachment piece 4 comprises four horns **4*a* each provided with holes 6 aligned transversely to the longitudinal direction of a bracelet (not represented), horns 4*a* being arranged to attach the bracelet by means, for example, of a pin passing through holes 6. It is evident that other means of attaching the bracelet to the attachment piece are suitable. Moreover, the shape, length and width and the number of horns 4*a*** may vary depending on the type of watch.

Figure 2:
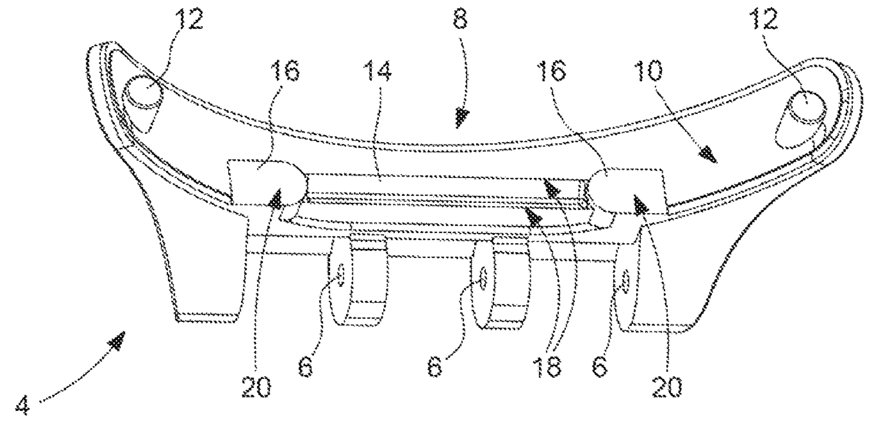
FIG. 2: a perspective view of an attachment piece according to one embodiment of the invention.
Figure 3:
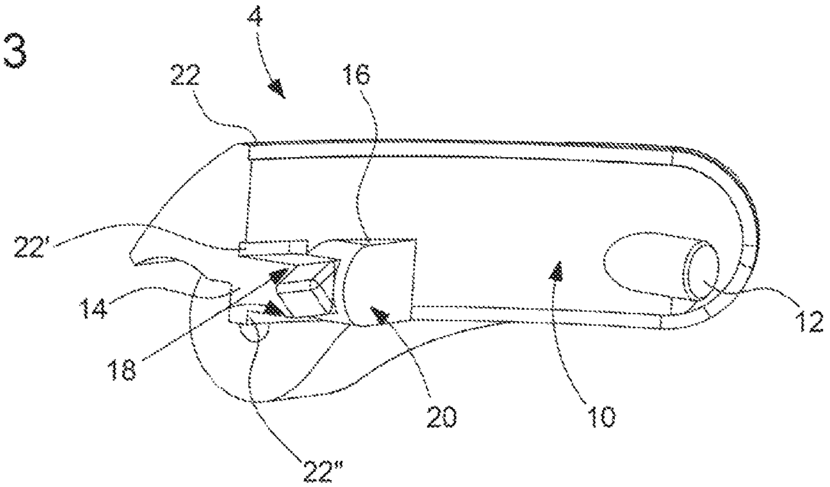
FIG. 3: a partial cut-away perspective view of an attachment piece according to one embodiment of the invention.
Figure 4:
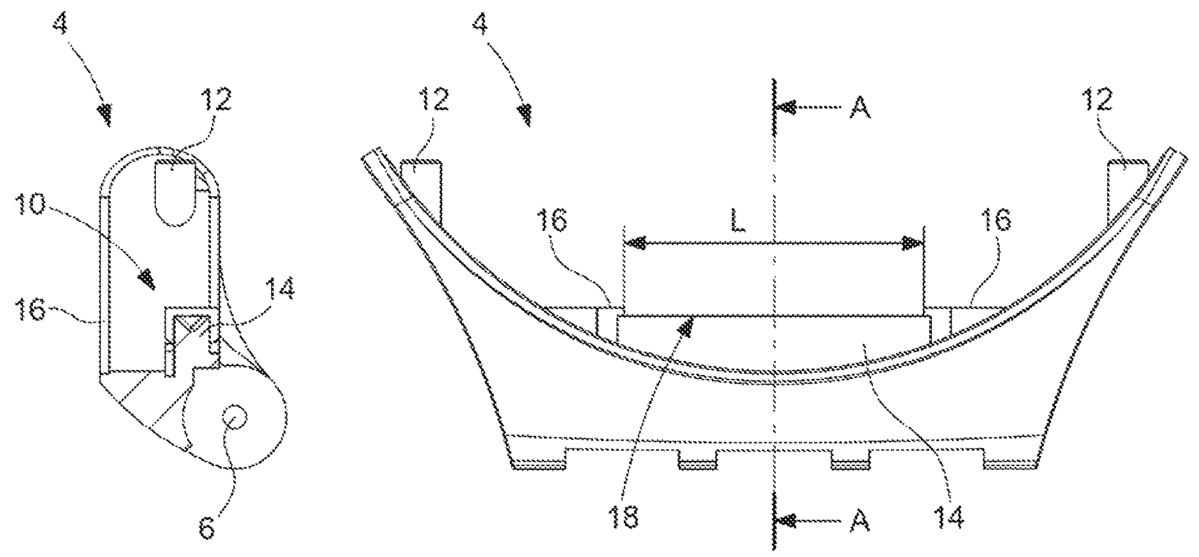
FIG. 4: a perspective view of an attachment piece and a cross-section of the horn along the axis A-A, according to one embodiment of the invention.

FIGS. 2-4 illustrate attachment piece 4 according to a preferred embodiment of the invention. Attachment piece 4 is generally curved and comprises a first connector 8 configured to cooperate with a second connector of the case middle in order to attach attachment piece 4 to the case middle. First connector 8 has a circular inner surface 10, perpendicular to main plane P, configured to be in direct contact with the case middle. First connector 8 comprises two tenons 12, a 'V' shaped portion 14 and two deflectors 16, all protruding inwardly from circular inner surface 10 (i.e. towards the case middle).

Tenons 12 are arranged symmetrically on either side of attachment piece 4 and are cylindrical in shape, the base of the cylinder being perpendicular to main plane P. According to other embodiments, tenons 12 can have other shapes, e.g. a parallelepiped shape, a conical shape, etc. . . .

'V' shaped portion 14 extends over a length L. 'V' shaped portion 14 is arranged such that the two tips of the 'V' are radially innermost. The two tips of the 'V' define two edges 18, of length L, collinear to main plane P. The two edges 18 are comprised in the same plane perpendicular to plane P. According to other embodiments, edges 18 can have two different lengths and/or be comprised in two different planes.

The two deflectors 16 are arranged laterally on either side, symmetrically, of 'V' shaped portion 14, as represented in FIGS. 2-4. Each deflector 16 has a planar inner abutment surface 20. Deflectors 16 protrude further than 'V' shaped portion 14, in particular, the two abutment surfaces 20 protrude further than the two edges 18. The two abutment surfaces 20 are comprised in the same plane perpendicular to plane P.

Attachment piece 4 further comprises several slots 22, 22', 22". Slot 22 creates a recess on the periphery of circular inner surface 10. Slots 22', 22" are located at the base of protruding 'V' shaped portion 14, thereby creating two recesses on circular inner surface 10.

'V' shaped portion 14 is made of plastic. Horn 4 can be wholly made of plastic. Horn 4 is preferably moulded.

Figure 5:
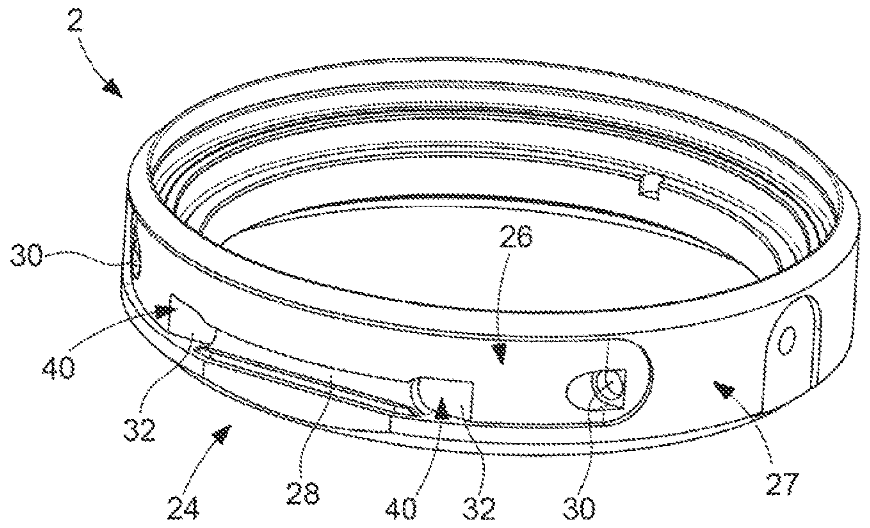
FIG. 5: a perspective view of a case middle according to one embodiment of the invention.
Figure 6:
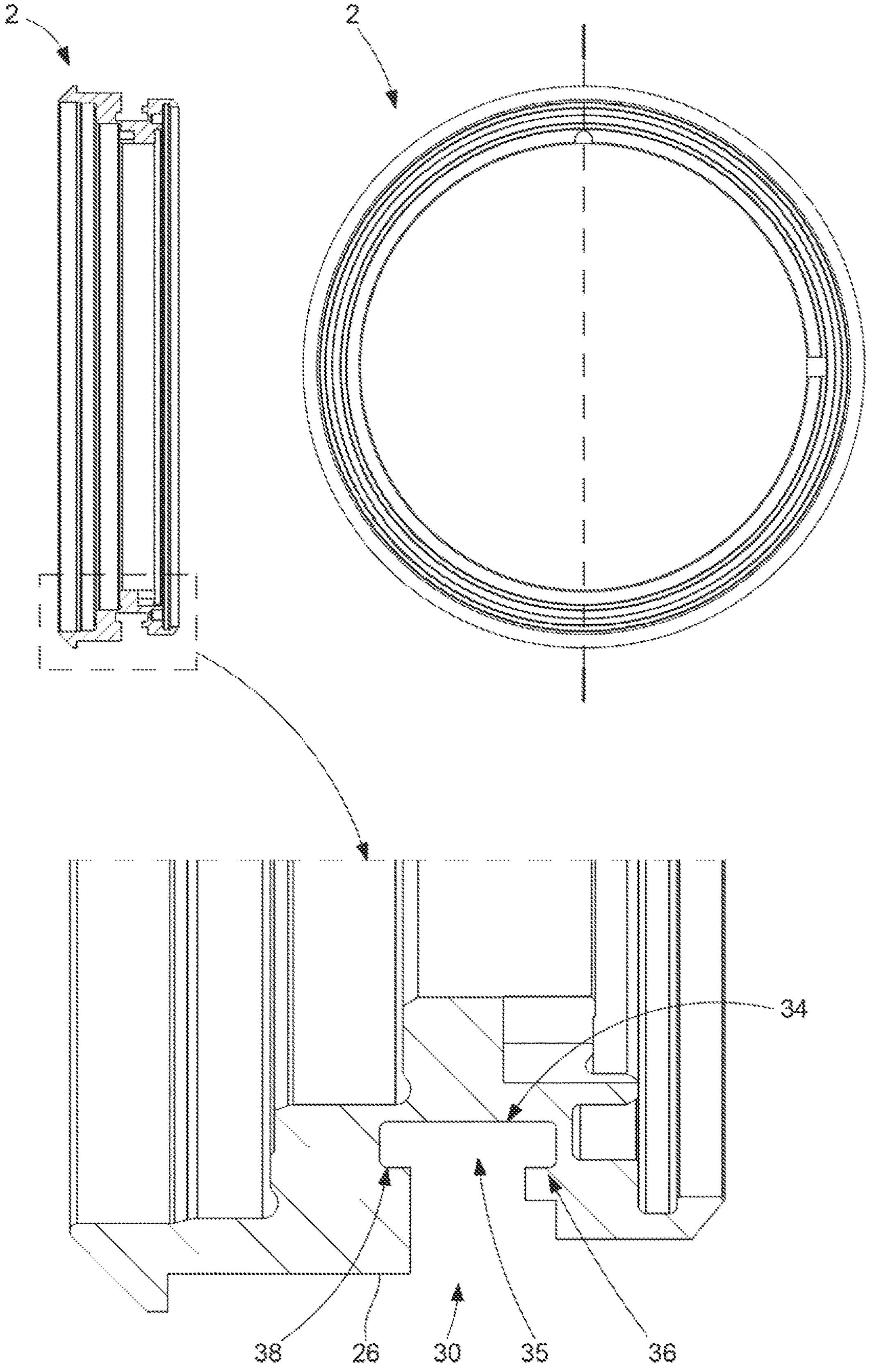
FIG. 6: a perspective view of a case middle and a cross-section of the case middle along the axis A-A, according to one embodiment of the invention.

FIGS. 5-6 illustrate case middle 2 according to a preferred embodiment of the invention. Case middle 2 includes a second connector 24 configured to cooperate with the first connector of the attachment piece in order to attach the attachment piece to case middle 2. In particular, second connector 24 comprises a curved surface 26 radially set back with respect to radially outer surface 27 of case middle 2, configured to be placed in direct contact with circular inner surface 10 of attachment piece 4. Second connector 24 comprises an undercut groove 28, two mortises 30 and two hollow portions 32, all of which are depressed with respect to curved surface 26.

Mortises 30 are arranged symmetrically on either side of second connector 24. Mortises 30 have a cylindrical shape with the base of the cylinder perpendicular to main plane P. According to other embodiments, mortises 30 can have other shapes, e.g. parallelepiped, conical, etc. . . .

Undercut groove 28 has a radially inner planar abutment surface 34. Further, undercut groove 28 includes a recess 35 delimited by radially inner abutment surface 34 and a first radially outer abutment surface 36 and a second radially outer abutment surface 38. The two abutment surfaces 36 and 38 are comprised in the same plane perpendicular to plane P.

The two hollow portions 32 are arranged symmetrically on either side of undercut groove 28, as represented in FIGS. 5-6. Each hollow portion 32 has a planar inner abutment surface 40. The two abutment surfaces 40 are comprised in the same plane, perpendicular to plane P.

Second connector 24 is preferably machined. Further, the second connector is preferably made of steel.

Figure 7:
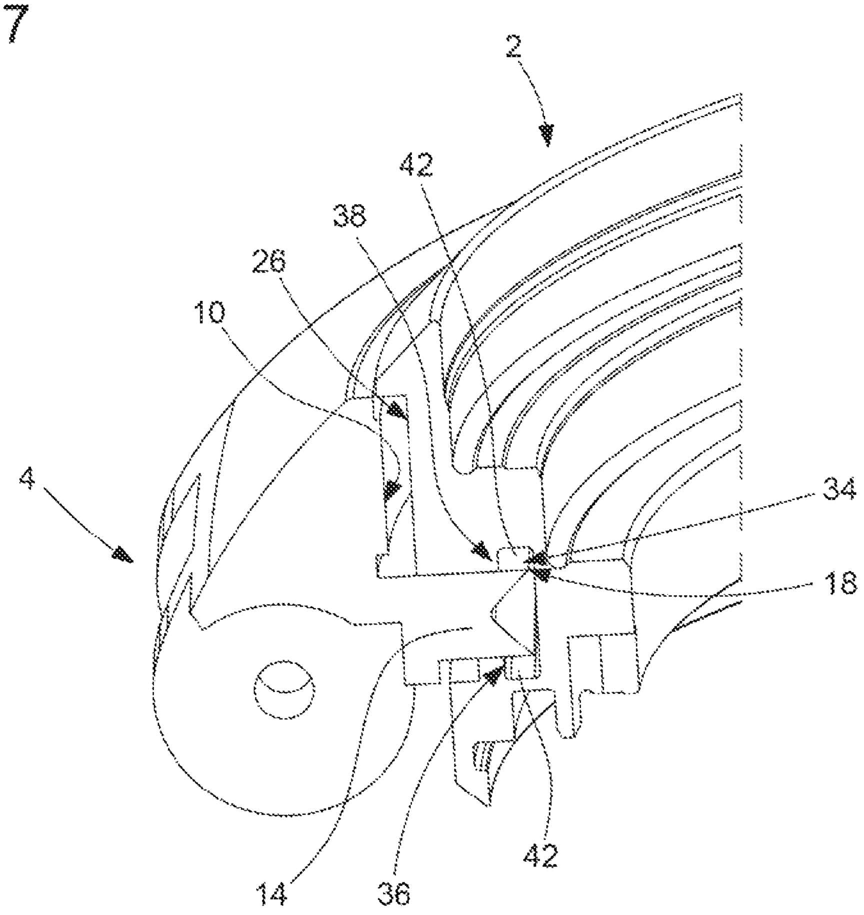
FIG. 7: a sectional view of a case middle and of an attachment piece placed in contact according to one embodiment of the invention.

FIG. 7 is a sectional view and illustrates the contact of the first connector of the attachment piece with the second connector 24 of case middle 2.

The two edges 18 of 'V' shaped portion 14 are configured to be in direct contact with radially inner planar abutment surface 34 of the undercut groove, when case middle 2 is placed in contact with attachment piece 4. In other words, the two edges 18 of 'V' shaped portion 14 are in direct contact when the connectors are positioned fully one inside the other.

'V' shaped portion 14 partitions recess 35 into two intermediate cavities 42 delimited by a surface of 'V' shaped portion 14 and by radially inner planar abutment surface 23 and second radially outer abutment surfaces 36 and 38.

In this position, circular inner surface 10 of the horn and curved surface 26 of the case middle are configured not to be in contact with each other, thereby leaving an intermediate space devoid of material. Likewise, the radially outer surface of slot 22' is not in contact with the case middle, also leaving an intermediate space devoid of material.

Furthermore, and with reference to FIGS. 1-7, the two deflectors 16, in particular planar inner abutment surfaces 20, are configured not to be in direct contact with the two hollow portions 32, in particular inner abutment surfaces 40, when the case middle comes into full contact with horn 4. More particularly a space remains between the two deflectors 16 and the two hollow portions 32 when the two edges 18 are in contact with radially inner planar abutment surface 34 of undercut groove 28.

It will be appreciated that the tenons and mortises make it possible to facilitate the correct placement of attachment piece 4 on case middle 2. Indeed, the contact is guided by the tenons and mortises.

Figure 8:
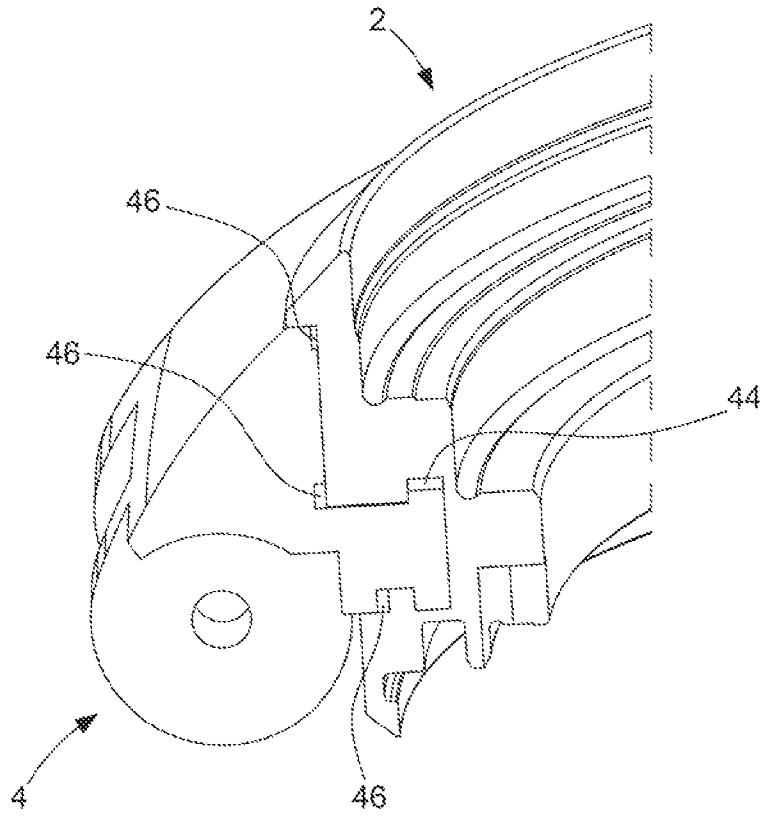
FIG. 8: a sectional view of an integral case middle/horn assembly according to one embodiment of the invention.

'V' shaped portion 14 is then melted by ultrasound, so as to create a molten material. The molten material moves (flows) into the two intermediate cavities 42. It follows that intermediate cavities 42 are filled, at least partially, by displacement of the molten material (see, e.g. FIG. 8 where one part 44 of an intermediate cavity 44 remains devoid of material). Preferably, intermediate cavities 42 are completely filled.

It will be appreciated that tenons 12 of attachment piece 4 housed inside mortises 30 of case middle 2 facilitate the holding in place of attachment piece 4 and case middle 2 during the ultrasound fusion of 'V' shaped portion 14.

Further, a compression force is applied to the case middle/horn assembly. In this manner, the molten material of 'V' shaped portion 14 is forced to move into intermediate cavities 42.

It will also be appreciated that the two deflectors 16 (see e.g. FIG. 3) prevent the displacement of molten material occurring sideways, but substantially only towards the intermediate cavities and/or buffer cavities (see below).

The fusion of 'V' shaped portion 14 also allows circular inner surface 10 of the attachment piece and curved surface 26 of the case middle to be moved together and placed in contact.

Slots 22, 22', 22" arranged on attachment piece 4 cooperate with curved surface 26 to define several buffer cavities 46. Buffer cavities 46 can be filled, at least partially, by molten material from portions of attachment piece 4 and case middle 2. In this manner, some molten material, possibly surplus with respect to the intermediate cavities, fills buffer cavities 46. This prevents molten material seeping out through the interface between the two connectors of the horn and the case middle and thus being visible on the edges of these latter elements. The aesthetic appearance is thus maintained.

The molten material is then solidified. The undercut cavity is now at least partially filled with solid material: the case middle/horn assembly is integrally joined. Indeed, the removal of the attachment piece is now sterically prevented by the solid material that has flowed from 'V' shaped portion 14 into intermediate cavities 42.

It is to be noted that a case middle/horn assembly was discussed above. According to one embodiment, two horns can be attached to the same case middle in accordance with the same method.

Although particular embodiments have just been described in detail, those skilled in the art will appreciate that various modifications and alternatives thereto could be developed in light of the overall teaching provided by the present disclosure of the invention. Consequently, the specific arrangements and/or methods described herein are intended to be given purely by way of illustration, with no intention of limiting the scope of the invention.

The invention claimed is:

1. A method for attaching an attachment piece with at least one horn to a watch case middle, the attachment piece comprising a first connector and the case middle being made of a metal material comprising a second connector having an undercut groove whose section has a T-shape, the first connector cooperating with the second connector to attach the attachment piece to the case middle, the method comprising:

placing the first connector of the attachment piece in contact with the second connector of the case middle in a direction parallel to a plane of the watch such that two intermediate cavities are formed between the undercut groove and the first connector;

melting one portion of the first connector of the attachment piece so as to create a molten material;

filling, at least partially, two intermediate cavities by displacement of the molten material; and solidifying the molten material so as to make the attachment piece integral with the case middle, and wherein the first connector comprises one or more protruding deflectors such that the displacement of the molten material occurs substantially only towards the intermediate cavities.

2. The method according to claim 1, comprising compressing the attachment piece and the case middle in order to fill, at least partially, the intermediate cavities by displacement of the molten material.

3. The method according to claim 1, wherein the melting of the first connector portion is carried out by ultrasound.

4. The method according to claim 3, wherein the first connector comprises a tenon and the second connector comprises a mortise, the contact of the first connector of the attachment piece with the second connector of the case middle being guided by the tenon and the mortise.

5. The method according to claim 4, wherein the first connector comprises two or more tenons and the second connector comprises two or more mortises, the contact of the first connector of the attachment piece with the second connector of the case middle being guided by the tenons and the mortises.

6. The method according to claim 3, further comprising at least partly filling, with the molten material, buffer cavities present between the first connector and the second connector when said first and second connectors are in contact.

7. A case middle and horn assembly obtained by the method for attaching a horn to a watch case middle according to claim 3.

8. A case middle and horn connection device for a watch comprising:

an attachment piece with at least one horn comprising a first connector; and a case middle made of a metal material comprising a second connector having an undercut groove whose section is T-shaped;

wherein the first connector is configured to cooperate with the second connector in order to attach the attachment piece to the case middle, wherein the first connector and the second connector are configured to be placed in contact in a direction parallel to the plane of the watch such that one or more intermediate cavities are formed between the undercut groove and the first connector, wherein the two intermediate cavities are configured to allow at least partial filling of said cavities by displacement of molten material from one portion of the first connector, wherein the attachment piece and the case middle are configured to be made integral by solidification of the molten material, and wherein the first connector comprises one or more protruding deflectors such that the displacement of the molten material occurs substantially only towards the intermediate cavities.

9. The case middle and horn connection device according to claim 8, wherein the portion of the first connector is configured to be melted by ultrasound.

10. The case middle and horn connection device according to claim 8, wherein the first connector is made of plastic.

11. The case at middle and horn connection device according to claim 8, wherein the first connector comprises a tenon and the second connector comprises a mortise, the mortise being configured to guide the tenon when the first connector of the attachment piece is placed in contact with the second connector of the case middle.

12. The case middle and horn connection device according to claim 11, wherein the first connector comprises two or more tenons and the second connector comprises two or more mortises, the mortises being configured to guide the tenons when the first connector of the attachment piece is placed in contact with the second connector of the case middle.

13. The case middle and horn connection device according to claim 8, characterised in that the attachment piece comprises four horns.

* * * * *